United States Patent [19]
Fischer

[11] 4,153,435
[45] May 8, 1979

[54] AMMONIA ABSORBER

[76] Inventor: William A. Fischer, 2161 S. Platte River Dr., Denver, Colo. 80223

[21] Appl. No.: 693,148

[22] Filed: Jun. 7, 1976

[51] Int. Cl.$^2$ ............................................. B01D 47/00
[52] U.S. Cl. ......................................... 55/227; 55/70; 55/229; 261/118; 261/29; 261/70
[58] Field of Search ................ 55/70, 84, 227, 229, 55/219; 261/118, 29, 26, DIG. 46, 97, 70

[56] References Cited

U.S. PATENT DOCUMENTS

| | | | |
|---|---|---|---|
| 447,327 | 3/1891 | Hussey et al. | 55/219 |
| 879,149 | 2/1908 | Cunningham | 261/118 |
| 997,430 | 7/1911 | Whittlesey | 261/DIG. 11 |
| 1,252,592 | 1/1918 | Lovekin | 261/118 |
| 1,538,457 | 5/1925 | Zoelly | 261/118 |
| 2,149,593 | 3/1939 | Fleisher | 261/29 |
| 2,583,252 | 1/1952 | Carraway | 55/227 |
| 2,585,440 | 2/1952 | Collins | 55/227 |
| 3,104,959 | 9/1963 | Grosskinsky et al. | 55/70 |
| 3,406,498 | 10/1968 | Wistins | 55/227 |
| 3,672,126 | 6/1972 | Goettle | 55/227 |
| 3,679,369 | 7/1972 | Hashimoto et al. | 55/70 |
| 3,698,158 | 10/1972 | Kinnebrew | 55/227 |
| 3,701,235 | 10/1972 | Isaacson | 55/84 |

*Primary Examiner*—Bernard Nozick
*Attorney, Agent, or Firm*—James R. Young; John E. Reilly

[57] ABSTRACT

An apparatus and method for scrubbing or removing ammonia fumes by passing the ammonia vapor through a shower of ammonia-absorbent liquid such as water in a chamber are disclosed in this invention. The ammonia vapors are absorbed by and enter into solution with the liquid, the clean air is discharged into the atmosphere, and the solution of ammonia and liquid is disposed of in an appropriate manner. Preferably, a portion of the solution is recirculated to absorb additional ammonia in the chamber while the balance is discharged; and fresh make-up liquid is added to prevent the solution from becoming fully saturated with ammonia or from losing its effectiveness in the scrubbing process. The apparatus includes a cabinet, air transfer means, a shower chamber and means for producing a dense shower of liquid droplets, liquid circulator and discharge means and control mechanism to maintain absorbent liquid within the system.

5 Claims, 8 Drawing Figures

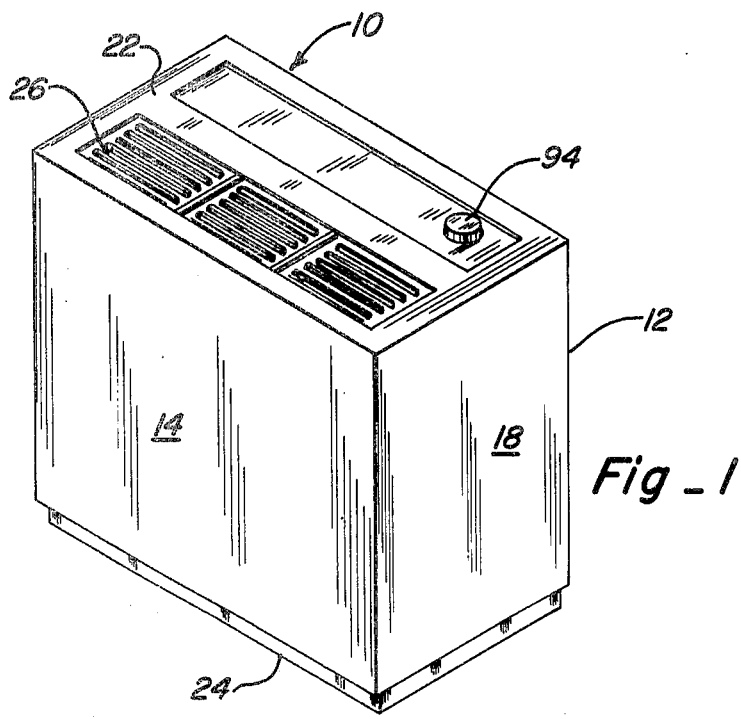
Fig_1
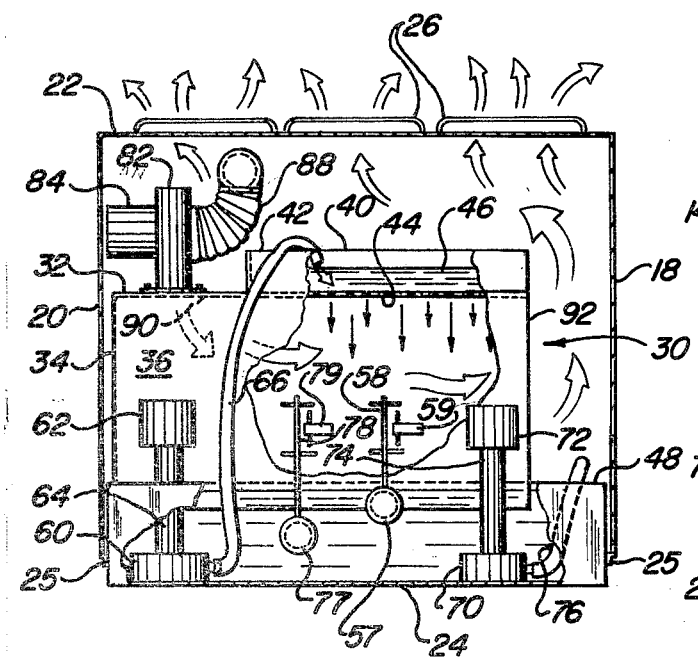
Fig_2
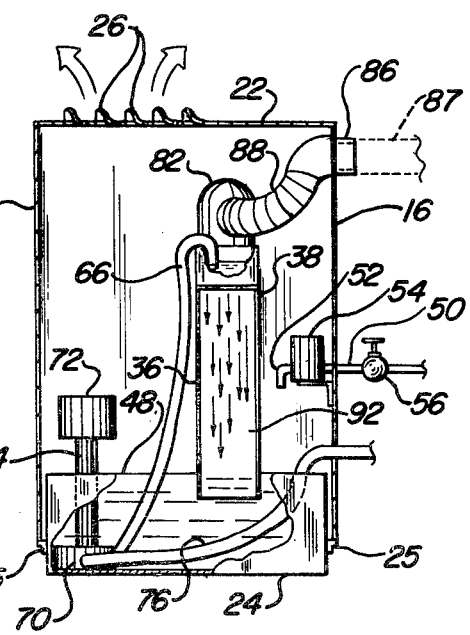
Fig_3

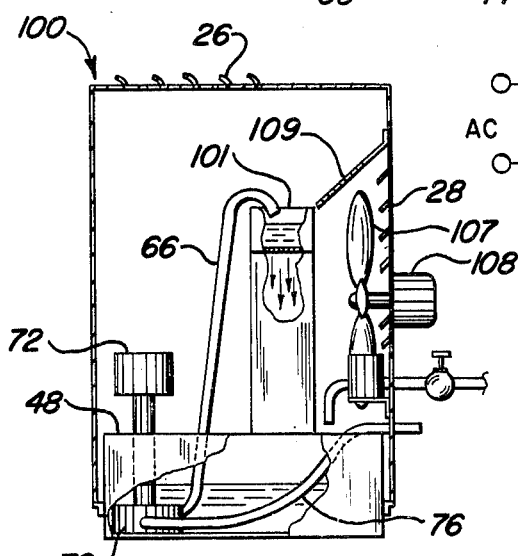
Fig_5
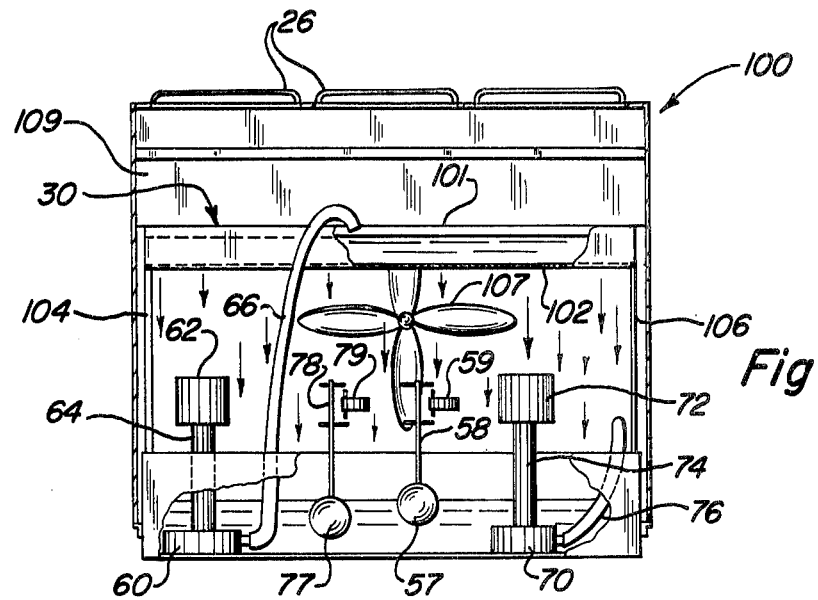
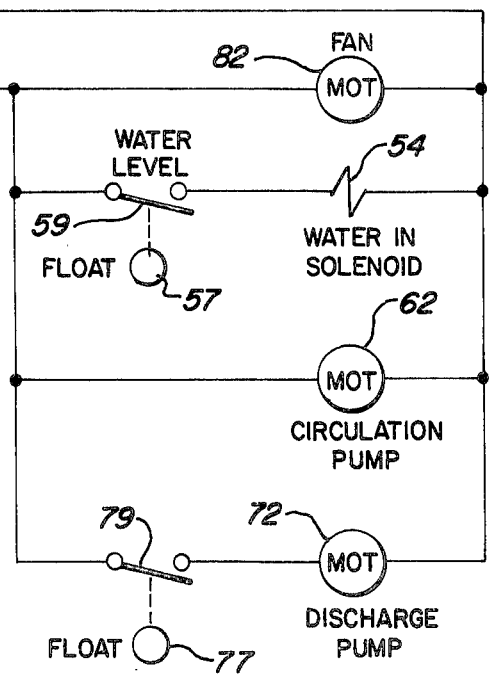
Fig_4
Fig_6

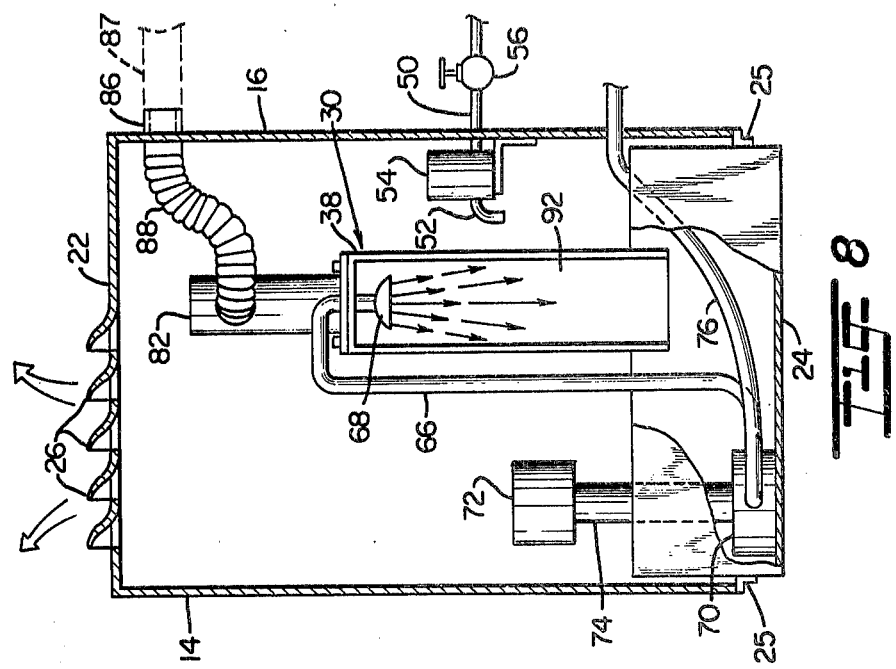
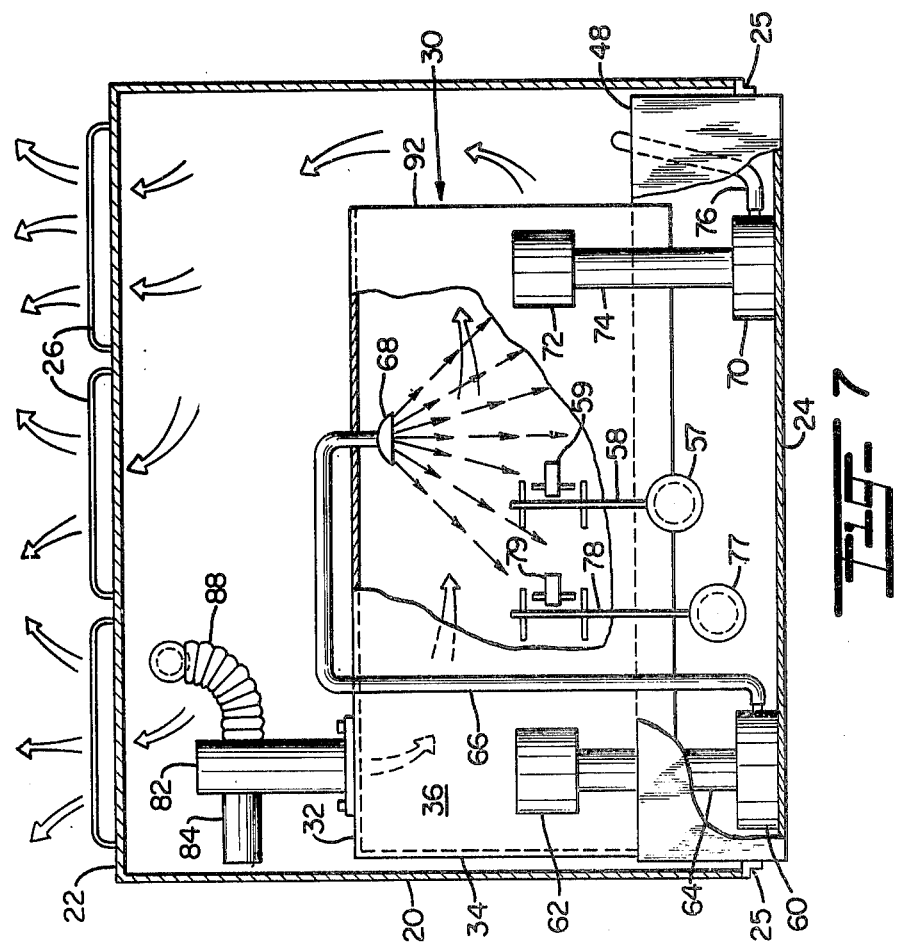

AMMONIA ABSORBER

BACKGROUND OF THE INVENTION

The present invention generally concerns air purifying devices for enclosed rooms, and more particularly a device for removing ammonia from air.

Ammonia is used in numerous technological processes in rooms necessarily occupied by persons working with the ammonia processes or in close proximity with machines that function with ammonia, such as the quite common ammonia wet diazo process for developing blueprints. Since ammonia is a highly volatile substance that readily enters into solution with air, ammonia fumes in such environments frequently become irritating to persons in the room and sometimes even constitute a danger to health. The Occupational Safety and Health Administration of the United States Government has recently issued regulations limiting the ammonia content in air to fifty (50) parts per million (p.p.m.) in a working environment, yet until the development of this invention, there was no known method and apparatus that could be used to reduce the ammonia content in air in an efficient, inexpensive manner.

The present invention includes an apparatus and method for effectively removing ammonia fumes and odors from the air and thereby reducing the ammonia content in the air to acceptable levels for the comfort and safety of persons in an ammonia-producing environment. In fact, it has been found that the present invention is effective to efficiently and inexpensively reduce the ammonia vapors in the air to less than 5 p.p.m. in a short period of time.

SUMMARY OF THE INVENTION

The ammonia absorber of the present invention removes ammonia from air by utilizing the ammonia-absorbing characteristic of water. It is well known that ammonia is highly soluble in water and that water has a great affinity for ammonia. The principle of the present invention is to pass a mixture of air and ammonia through a shower of water droplets and small streams resulting in the ammonia in the air being absorbed into the water whereby the ammonia can be effectively disposed of with the water.

The apparatus disclosed in the invention includes a shower chamber through which a mixture of air and ammonia is passed, means for producing a dense concentration of water droplets and small streams within the chamber, and means for collecting the water and absorbed ammonia solution for disposal. The apparatus also includes a fresh water supply system, a circulation system for circulating water from the collection means back into the droplet forming means, and a control system for maintaining a minimum amount of water within the system to prevent the system from running dry, and for regulating the maximum amount of water in the system to prevent overflow. The apparatus can be used either to draw a mixture of ammonia vapors and air directly off a machine or process which produces the ammonia vapors, force the air and ammonia solution through the water shower where the ammonia is scrubbed from the air, and discharge the clean air into the atmosphere. Alternatively, the apparatus can be fabricated simply to draw the mixture of air and ammonia vapors directly from the room atmosphere, circulate it through the shower bath, and discharge the clean air back into the room atmosphere for recycling.

Accordingly, it is an object of the present invention to provide a novel and improved method and apparatus for removing ammonia vapors from the air and disposing of the ammonia so removed.

It is also an object of the invention to provide an apparatus for producing a confined area with a dense shower of water droplets through which an air and ammonia mixture can be drawn in such a way that the ammonia will be absorbed from the air into the water.

It is a further object of the present invention to provide an apparatus which recycles the water through a shower chamber where ammonia is absorbed from air into the water until an optimum percentage of ammonia and water solution is obtained prior to discharging said water and ammonia solution and thereby conserving on the use of water in the ammonia absorption process.

It is a still further object of the present invention to provide an ammonia absorber apparatus wherein water is used to scrub ammonia vapors from air which includes control apparatus to prevent overflow of the water and to maintain an acceptable minimum quantity of water in the apparatus.

It is another object of the present invention to provide a simple, compact apparatus that is relatively easy and inexpensive to manufacture, yet will effectively reduce the ammonia content of the air in a room to acceptable levels for human habitation while being relatively inexpensive to operate and maintain.

BRIEF DESCRIPTION OF THE DRAWINGS

Other objects, advantages and capabilities of the present invention will become more apparent as the description proceeds taken in conjunction with the accompanying drawings, in which:

FIG. 1 is a perspective view of the ammonia absorber;

FIG. 2 is an elevational view of the ammonia absorber with the front panel of the cabinet removed to expose the elements of the apparatus, and with a portion of the water bath chamber being cut away to better illustrate the working functions of the apparatus;

FIG. 3 is an elevation view of the apparatus with the right end panel of the cabinet removed to reveal more detail of the elements;

FIG. 4 is an elevational view of the alternate embodiment with the right end panel of the cabinet removed to disclose the functional elements in the alternate embodiment;

FIG. 5 is an elevation view of the alternate embodiment with the front panel removed to reveal the functional elements therein; and FIG. 6 is a schematic diagram of the control circuit.

FIGS. 7 is an elevational view of ammonia absorber similar to FIG. 2 wherein shower head for introducing spray is utilized. FIG. 8 is an elevational view of apparatus of FIG. 7 similar to FIG. 3.

DETAILED DESCRIPTION OF THE PREFERRED EMBODIMENT

An ammonia absorber 10 in accordance with the present invention utilizes the well-known ammonia absorbing characteristic of water to remove ammonia from the air. This principle is implemented by blowing or drawing a mixture of air and ammonia through a shower bath of water wherein the ammonia is absorbed from the air by the water thereby causing the ammonia to go into a solution with the water. The thus scrubbed air is then discharged into the atmosphere and the solution of water and ammonia is disposed of in an appropriate manner.

The ammonia absorber 10 as shown in FIG. 1 includes a plenum 12 in the form of a cover or cabinet comprised of a front panel 14, rear panel 16, right side panel 18, left side panel 20, and a top panel 22. The base 24 is defined by a water sump pan 48, the function of which will be described below. As best seen in FIGS. 2 and 3, the cabinet is supported on base 24 by flanges 25 which are affixed to the sides of sump pan 48. The top panel 22 also includes louvered openings 26 for clean air discharge as will be described below in more detail. Also as will be described in more detail, the cabinet or cover forms a plenum 12 through which air is force-circulated during the scubbing process.

A shower chamber 30 is provided inside the plenum and defines the functional area in which the ammonia is scrubbed from the air by absorption into the water. The chamber is defined by a front wall 36, a rear wall 38, a top 32, and a left end wall 34. The right end and the bottom of the chamber 30 are left open. A water reservoir in the form of a trough 40 with bulkheads 42 is positioned on a portion of the top 32 of the chamber 30. The portion of the top 32 which also serves as the bottom of the trough 40 is perforated at 44 to allow the water in the trough to drip through the shower chamber 30. A water sump pan 48 is also positioned under the shower chamber 30 to collect the shower water from the shower chamber 30 and to serve as a water reservoir. It can also be appreciated that a shower head spray device could be substituted for the trough with a perforated bottom and still accomplish substantially the same function.

The fan 82 driven by motor 84 is mounted on a portion of top 32 near the enclosed end 34 of the shower chamber 30 and functions to draw a mixture of air and ammonia vapors from the ammonia vapor producing source and force it through the shower chamber 30. The air intake 86 is connected by an appropriate duct 87 shown in phantom lines in FIG. 3 to the ammonia vapor discharge area of an ammonia vapor producing device. The air and ammonia mixture is drawn off the ammonia vapor producing device through the duct 87 and intake 86 and into the fan 82 via the suction hose 88 which connects the fan 82 to the air intake 86. The fan 82 then blows the air and ammonia mixture into the shower chamber 30 through the air inlet 90 of the chamber. As indicated by the arrows in FIGS. 2 and 3, the air and ammonia mixture is forced to travel horizontally from the intake 90 through the shower chamber 30 under the perforated trough 44 where the ammonia is scrubbed from the air by the shower bath of water continually dripping through the perforated bottom 44 of water trough 40. It is in this shower chamber that the water absorbs the ammonia from the air and carries the ammonia in solution with the water droplets into the sump pan 48 at the bottom of the shower chamber 30. The scrubbed air now free of the ammonia vapors exits the shower chamber 30 through the air outlet 92 defined by the open side of the chamber 30. Once clear of the shower chamber 30, the scrubbed air is discharged back into the atmosphere through the louvered vent openings 26 in the top panel 22 of the plenum 12.

Since liquid water is the functioning material that scrubs the ammonia vapors from the air in the shower chamber 30 as described above, a continuous supply of fresh water is required. Fresh water is supplied to the ammonia absorber 10 by the water inlet pipe 50 entering the plenum 12 through the rear panel 16 as best seen in FIG. 3. A line valve 56 in the water inlet pipe 50 is provided to turn the water supply off when desired for disconnecting the ammonia absorber, repairing the apparatus, safety, or any other reason the operator would wish to discontinue the source of water. A solenoid valve 54 is provided on the water inlet pipe to regulate the influx of fresh water as will be described below, and a downturned end 52 is provided to direct the flow of incoming water into the pan 48.

A circulator water pump 60 draws water from the pan 48 and pumps it through the water delivery hose 66 into the water trough 40. The circulator pump 60 is driven by a motor 62 which is supported above the water level in the pan 48 by a shaft housing 64. As can be appreciated from the description above, the water 46 in trough 40 drips through the perforated bottom 44 resulting in the shower bath for scrubbing the ammonia from the air. The water droplets are then collected in the pan 48 and can be recirculated through the shower cycle.

Since the water is continuously recirculated through the shower chamber 30 to absorb ammonia as described above, it would ultimately become saturated or nearly saturated with ammonia and would lose its effectiveness as a scrubber fluid; therefore, it is necessary to allow fresh water into the system through the water inlet pipe 50 and to discharge some of the water and ammonia solution from the system. A discharge pump 70 with a motor 72 supported above the water level by shaft housing 74 is provided for this purpose. The pump 70 draws water from the pan 48 and pumps it through the discharge hose 76 out of the system to some convenient disposal drain.

Thus, it can be appreciated that while there is some ammonia in solution in the water at all times, the discharge of some of the ammonia and water solution while being made up by incoming fresh water maintains a near optimum solution which is still capable of effectively absorbing the water from the air in the scrubbing process in the shower chamber 30 while not wasting the water as would occur if fresh water were simply passed once through the shower chamber 30 and discharged with whatever minimal amount of ammonia it may have absorbed.

While the rates of flow of the water through the various components described above are coordinated as much as practical, some control is necessary to insure that the pan 48 neither overflows from an excess amount of water in the system nor runs dry from a deficiency of water in the system so as to render the ammonia absorber 10 completely ineffective as a scrubbing device. Consequently, overflow is prevented by the solenoid valve 54 which is capable of shutting off the influx of water through inlet pipe 50 into the system. The solenoid valve 54 is operated by a float switch comprised of a float 57 positioned in the pan 48, a microswitch 59, and a connecting sensor rod 58. When the water level in the pan 48 reaches a predetermined level just prior to overflow, the float 57 forces rod 58 to activate microswitch 59 causing an electric circuit to activate the solenoid valve 54 thus shutting off the water inlet. Alternately, when the water level in pan 48 recedes sufficiently, the float 57 will recede with the water level and the solenoid valve 54 will again allow fresh water to flow into the system.

A similar float switch associated with the circuit for the discharge pump 70 is also provided to maintain an effective minimum water level thereby preventing the system from running dry. This float switch is comprised of float 77, a microswitch 79, and a sensor rod 78 connecting the float 77 to the microswitch 79. While the discharge pump 70 is normally operating to discharge the water and ammonia solution from the system, the float switch just described is preset so that in the event the water level in pan 48 drops to a predetermined level, the float 77 will also drop to that level deactivating the microswitch 79 which interrupts the electrical circuit driving the discharge pump motor 72 causing the discharge pump 70 to stop pumping. The float switch then prevents further operation of the discharge pump 70 until the water level in pan 48 again rises to a predetermined level at which time the float switch will again allow the discharge pump 70 to operate.

While it is contemplated that the flow rates and speeds of the several components described above would be preset at optimum operating levels, it may also be desirable to provide speed control devices such as rheostats in the circuits of both the circulator pump and the discharge pump as well as in the fan circuit.

An appropriate electrical circuit is illustrated in FIG. 6 wherein the master on-off switch 94 is provided to interrupt the flow of electricity to all of the components including the fan motor 82, the water inlet solenoid valve 54, a circulator pump motor 62, and the discharge pump motor 72. The maximum water level control including float 57 and microswitch 59 is represented in the local circuit for the inlet solenoid valve 54, and the minimum water level control float 77 and microswitch 79 are represented in the local circuit for the discharge pump motor 72, whereby the components will function as described above.

An alternate embodiment of the present invention is illustrated in FIGS. 4 and 5. Rather than being designed to draw the air and ammonia mixture directly off the device producing ammonia as described above for the preferred embodiment, this alternate embodiment 100 is designed to simply draw the air and ammonia mixture into the plenum 12 directly from the room atmosphere, force it through a shower bath 30 where the ammonia will be scrubbed from the air, and discharging the air into the room atmosphere for continuous recirculation through the ammonia absorber. In this alternate embodiment, the rear panel 16 of the cabinet includes louvered air inlet openings 28, and an open bladed fan 107 driven by motor 108 is mounted in the rear panel 28. The shower chamber 30 does not have any rear wall or front wall but includes only the left side wall 104 and a right sidewall 106. The sidewalls 104 and 106 support a water trough 101 with a perforated bottom 102 which covers the entire length of the shower chamber 30. All of the components in this alternate embodiment operate in the same manner as those described above in the preferred embodiment, except the open-bladed fan 107 draws the air and ammonia mixture directly from the room atmosphere into the plenum 12 through the louvered inlet openings 28 and forces the solution through the shower chamber 30 from back to front where the ammonia is scrubbed from the air by absorption into the water. Finally the scrubbed air is discharged back into the room atmosphere through louvered discharge openings 26 in the top panel 22 of the ammonia absorber. A shroud 109 is attached to the rear panel 16 and extends over the open-bladed fan 107 to the shower chamber 30 to confine the flow of air through the shower chamber.

Although the present invention has been described with a certain degree of particularity, it is understood that the present disclosure has been made by way of example and that changes in details of structure may be made without departing from the spirit thereof.

As indicated above, a shower head spray device can be used in place of the trough 40 with a perforated bottom 44 of the preferred embodiment. Accordingly, as best seen in FIGS. 7 and 8, an alternate embodiment has the water delivery hose 66 terminating in a shower head 68 inside and near the top of shower chamber 30 for introducing a shower or spray of water in shower chamber 30 for scrubbing the ammonia from the air that passes through the shower chamber 30, as described above for the preferred embodiment.

What is claimed is:

1. An ammonia absorber apparatus for absorption of ammonia vapor, comprising:

first and second chambers, said first chamber enclosed within said second chamber;

a dispensing pan with a perforated bottom positioned over said first chamber for introducing droplets of water into said first chamber to provide a continuous shower of said water through said first chamber;

a sump pan associated with said first chamber at the lower end thereof for gathering and containing said droplets of water;

delivery means for passing fluid containing ammonia vapor through said first chamber in contact with said shower and then into said second chamber;

exhaust means associated with said second chamber for exhausting said fluid therefrom;

water circulating means connected to said sump and to said dispensing pan for recirculating and delivering a portion of the collected water in said sump to said dispensing pan, said water circulating means being activated throughout the operation of ammonia absorber to deliver said water to said dispensing pan;

water supply inlet means associated with said sump for introducing a supply of fresh water into said sump, and water inlet control means sensitive to a first water level in said sump for activating and deactivating said water supply inlet means, said water inlet control means being operative to activate said water supply inlet means when the actual water level in said sump is below said first water level and to deactivate said water supply inlet means when the actual water level in said sump is at and above said first water level; and water discharge means connected to said sump for discharging a portion of the water in said sump out of the absorber apparatus, and water discharge control means sensitive to a second water level in said sump which is below said first water level for activating and deactivating said water discharge means, said water discharge control means being operative to deactivate said water discharge means when the actual water level in said sump is at or below said second water level and to activate said water discharge means when the actual water level in said sump is above said second water level.

2. An ammonia absorber apparatus for cleansing air containing ammonia vapor, comprising:

a plenum with an air inlet opening therein for introducing air into said apparatus and an air outlet opening therein for exhausting air from said apparatus;

a chamber inside said plenum also having an air inlet opening therein for exhausting said air from said chamber;

a fan in an enclosed housing, a first duct connecting said air inlet opening in said plenum to said housing, and a second duct connecting said housing to said air inlet opening in said chamber;

a reservoir for ammonia absorbing liquid in the form of a substantially horizontal pan at least equal in horizontal cross-section with said chamber and mounted above and adjacent to said chamber and having a perforated bottom for allowing said ammonia absorbing liquid to flow under gravity from said reservoir in the form of a shower through said chamber;

a liquid retainer under and adjacent said chamber for collecting said liquid and temporarily storing it for recycling through said reservoir and said chamber and for discharge from said ammonia absorber apparatus;

a liquid inlet means for introducing fresh liquid into the ammonia absorber apparatus;

a first pumping means for continuously transferring said liquid from said liquid retainer to said reservoir; and a second pumping means for permanently discharging said liquid from said liquid retainer to a location external said ammonia absorber apparatus, said liquid inlet means and said first and second pumping means cooperating to mantain a continuous supply of said liquid in said reservoir.

3. The ammonia absorber of claim 1, wherein said delivery means includes an opening in said second chamber in substantially horizontal alignment with the trajectories of said droplets, an opening in said first chamber in substantially horizontal alignment with said opening in said second chamber, a fan positioned between said opening in said second chamber and said opening in said first chamber, and a shroud extending between said opening in said second chamber and said opening in said first chamber and spaced radially outward of said fan.

4. The ammonia absorber apparatus of claim 2, including a first float actuated switch sensitive to a selected level of said absorbing liquid in said liquid retainer and connected to said second pumping means to prevent said second pumping means from excessively depleting the supply of liquid in said liquid retainer, and a second float actuated switch connected to said liquid inlet means for preventing excessive fresh liquid from entering through said inlet means and causing said liquid retainer to overflow, said first float actuated switch being sensitive to a first water level in said liquid retainer and a second float actuated switch being sensitive to a second water level in said liquid retainer which second water level is higher than said first water level, whereby said first and second float actuated switches in combination with said second pumping means and said liquid inlet means are operative to maintain a selected level of liquid in said reservoir and said liquid retainer while allowing continuous recycling of at least part of said absorbing liquid by said first pumping means.

5. An ammonia absorber apparatus for absorption of ammonia vapor, comprising:

a spray nozzle for introducing droplets of water into said first chamber to provide a continuous shower of said water through said first chamber;

a sump pan associated with said first chamber at the lower end thereof for gathering and containing said droplets of water;

delivery means for passing fluid containing ammonia vapor through said first chamber in contact with said shower and then into said second chamber;

exhaust means associated with said second chamber for exhausting said fluid therefrom;

water circulating means connected to said sump and to said spray nozzle for recirculating and delivering a portion of the collected water in said sump to said spray nozzle, said water circulating means being activated throughout the operation of ammonia absorber to deliver said water to said spray nozzle;

water supply inlet means associated with said sump for introducing a supply of fresh water into said sump, and water inlet control means sensitive to a first water level in said sump for activating and deactivating said water supply inlet means, said water inlet control means being operative to activate said water supply inlet means when the actual water level in said sump is below said first water level and to deactivate said water supply inlet means when the actual water level in said sump is at and above said first water level; and water discharge means connected to said sump for discharging a portion of the water in said sump out of the absorber apparatus, and water discharge control means sensitive to a second water level in said sump which is below said first water level for activating and deactivating said water discharge means, said water discharge control means being operative to deactivate said water discharge means when the actual water level in said sump is at or below said water level and to activate said water discharge means when the actual water level in said sump is above said second water level.

* * * * *

UNITED STATES PATENT OFFICE
CERTIFICATE OF CORRECTION

Patent No. 4,153,435  Dated May 8, 1979

Inventor(s) William A. Fischer

It is certified that error appears in the above-identified patent and that said Letters Patent are hereby corrected as shown below:

IN THE CLAIMS:

Claim 4, Column 8, line 2, cancel "a" and substitute -- said --.

Claim 5, Column 8, line 51, after "said" (first occurrence) add -- second --.

Signed and Sealed this

Eighth Day of January 1980

[SEAL]

Attest:

SIDNEY A. DIAMOND

Attesting Officer  Commissioner of Patents and Trademarks